(12) United States Patent
Ishii (10) Patent No.: US 6,183,798 B1
(45) Date of Patent: Feb. 6, 2001

(54) METHOD FOR THE STEAM TREATMENT OF BEANS

(76) Inventor: Shigeru Ishii, 8-7, 2-chome, Honhaneda, Ota-ku, Tokyo (JP)

( * ) Notice: Under 35 U.S.C. 154(b), the term of this patent shall be extended for 0 days.

(21) Appl. No.: 09/263,797

(22) Filed: Mar. 5, 1999

(30) Foreign Application Priority Data

Mar. 9, 1999 (JP) .................................. 10-057126

(51) Int. Cl.[7] ................. A23L 1/20; A23L 1/00
(52) U.S. Cl. .................. 426/507; 426/506; 426/508; 426/509; 426/511; 426/523; 426/321; 426/510
(58) Field of Search .................... 426/399, 412, 426/460, 461, 442, 507, 510, 506, 508, 509, 511, 321, 523; 99/410

(56) References Cited

U.S. PATENT DOCUMENTS 5,215,500 * 6/1993 Deasge et al. .................. 99/331
5,707,672 * 1/1998 Taguchi et al. .................. 426/399

\* cited by examiner

*Primary Examiner*—Milton Cano
*Assistant Examiner*—Philip Dubois
(74) *Attorney, Agent, or Firm*—David O'Reilly (57) ABSTRACT

A method for the steam treatment of beans in which beans are inserted into a chamber (1). Steam at high pressures ("pressure" hereinafter indicates a gauge pressure) of 5 to 7 Kg/cm$^2$, and at high temperatures 158 to 169° C. is jetted into the chamber. Beans in chamber (1) are exposed to the saturated steam at high pressures of 5 to 7 Kg/cm$^2$ and high temperatures of 158 to 169° C. for a period of 15 to 30 seconds so that boiling of beans achieved in a sterilized state.

4 Claims, 10 Drawing Sheets

METHOD FOR THE STEAM TREATMENT OF BEANS

BACKGROUND OF THE INVENTION (1) Field of the Invention

The present invention relates to a method for high-speed boiling of soybeans, adzuki beans, kintokimame or a large kind of adzuki beans, midorimame or green beans, zatto or uncultivated beans, tebo or a kind of black-eye pea, kidney beans, mustard beans and other types of cooked beans, fermented soybeans, miso, tofu, soy sauce, mustard, bean jam, and sweet jelly of beans, and an apparatus therefor.

(2) Description of the Prior Art

Figure 10:
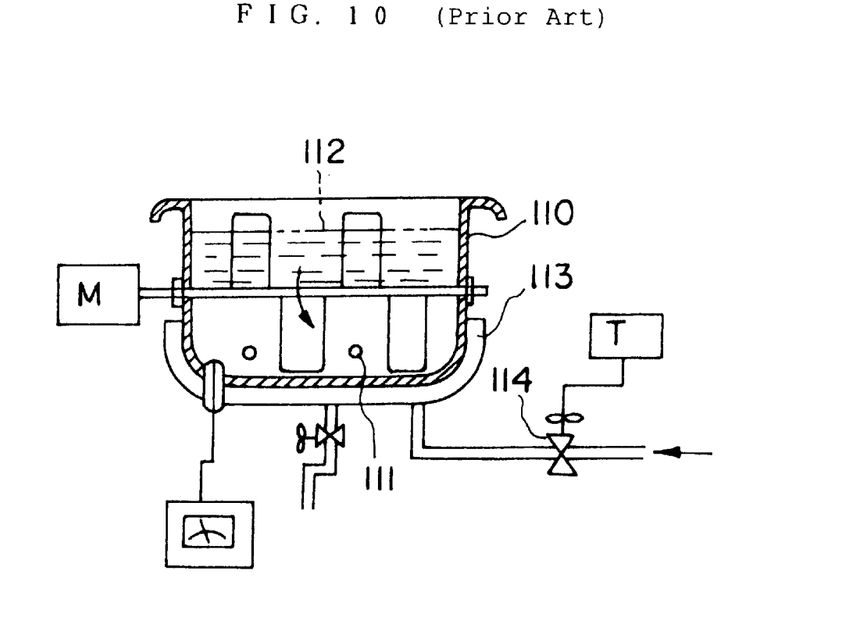
FIG. 10 is an explanatory schematic drawing showing an apparatus for steaming of beans.

When manufacturing or processing cooked beans, fermented soybeans, miso, soy sauce and other types of beans, boiling the beans is necessary. Heretofore, an apparatus for boiling beans is disclosed in Japanese Patent Publication (Kokai) No. 254446 of 1993 (Heisei 5). In a method of boiling beans of Japanese Patent Publication (Kokai) No. 254446 of 1993 (Heisei 5), as shown in FIG. 10, beans 111 are inserted loosely into a heating kettle 110, or beans 111 are put in a basket and inserted into a heating kettle 110 open to the atmosphere, when the shape of grained beans is required for cooked beans, and a given amount of water 112 is added to the beans. The beans and water in the heating kettle 110 are heated under the atmosphere, by sending steam heated in a boiler into a jacket 113 provided at the lower portion of heating kettle 110. Further, a slightly pressurized kettle in which the inside thereof is slightly pressurized to the order of 0.8 atmospheric pressure. In the process of boiling the beans, valve 114 through which steam is sent to the jacket 113 is opened and shut by a hand or electronically by a worker in constant attendance, by which the temperature within heating kettle 110 is controlled.

In the process of boiling the beans, the supply of heat is carried out considering the characteristic of various beans in the process of boiling the beans. Even though the beans are of the same sort, the quality of beans is affected by the weather since beans are agricultural products. Therefore, the amount of water, how to heat, and the boiling period of the beans are controlled by experience and skill of a worker which were taken over from before the Heian Era.

However, for carrying out the process of boiling of the beans, even for boiling beans of 60 Kg, 1 to 1.5 hours are required, and for boiling beans of 300 Kg, 2 to 3 hours, namely 7,200 to 10,800 seconds are required. In this work, in order to watch for an abnormal state, a worker must be in constant attendance upon the process of boiling the beans. However, in the work of boiling of beans, how to complete the boiling of beans varies with sorts of bean material, the state of beans as hinemame or old beans after the lapse of many years, and the adjustment in hot taste in the case of mustard beans or with each preparation of heating kettle 110. Therefore, in spite of a skilled worker, it was difficult to obtain homogeneous cooked beans. To explain this further in detail, to boil beans in a conventional method means to change the nitrogen component contained in beans from unmodification region into modification region by steam or heat, wherein the chain combination HO—HO—HO— of starch contained in beans reacts with hydrogen to break into parts by heat energy of steam, for many hours, by which the starch is sweetened. When changing the nitrogen component contained in beans from unmodification region into appropriate modification region, temperature such as 100° C. is needed under atmospheric pressure, or a temperature such as 112° C. is needed under a slightly higher pressure of 0.5 atm. Therefore, heating becomes excessive. Since the flow of steam introduced is fast, even though it is desired to change nitrogen component contained in beans into the appropriate modification region, a portion of beans reaches a supermodification region, by which the quality of product is worsened generating a loss in product.

Further, in this conventional process of boiling of beans, the highest temperature within the kettle in the case where a kettle is opened to the atmosphere is 100° C., and the highest temperature within the kettle in the case of slightly pressurized kettle 110 where a lid is attached to the kettle is only 116° C. Further, a rise in temperature within heating kettle 110 to the highest temperature takes many hours, and many hours are required to finish boiling the beans. Further it was difficult to make vital germs of thermostable spore germs die out. However, when the time of boiling of beans is longer, beans are reduced to pieces, or the nitrogen component turns into a supermodification region so that quality of product is worsened. Further, if the beans are heated to above the temperature needed for boiling of beans, browning, spoiling of taste, deterioration of starch and other effects are generated so that product is inferior in quality and graded down. Heretofore, it was thought that even if beans are treated under high pressure and high temperature, the same defects as the said defects will be generated by turning into the supermodification region (excessive cooked region).

Further, heating kettle 110 takes up a large working space, which prevents rationalization in a work. Further, large amounts of moisture and heat loss are generated by radiant heat from around heat kettle 110 and waste steam is released from the upper portion of heat kettle 110, by which energy costs are increased and the surrounding work area is worsened.

Therefore, young workers do not remain in occupations of beans boiling work, and a rise in age of workers progresses.

BRIEF SUMMARY OF INVENTION

It is an object of the present invention to provide a method for high-speed steaming of beans in which without relying on experience and skill of workers, steaming of beans can be accomplished in a sterilized state in a very short period, by using high pressure and high temperature, wherein it was heretofore thought that use of high pressure and high temperature was senseless and impractical.

It is another object of the present invention to provide an apparatus for carrying out the above-mentioned method for high-speed steaming of beans.

The first object of the present invention is attained by a method of high-speed steaming of beans comprising the steps of: inserting the beans into a chamber; jetting or injecting steam at high pressures ("pressure" hereinafter indicates a gauge pressure) of 5 to 7 $Kg/cm^2$, and high temperatures of 158 to 169° C.; exposing the beans to the saturated steam at high pressures of 5 to 7 $Kg/cm^2$ and high temperatures of 158 to 169° C. for a period of 15 to 30 seconds so that steaming of the beans is achieved in a sterilized state.

The second object of the present invention is attained by an apparatus for high-speed steaming of beans comprising: a chamber 1 in which beans are put which withstands high pressures ("pressure" hereinafter indicates a gauge pressure) of 5 to 7 $Kg/cm^2$, and high temperatures of 158 to 169° C., and; a nozzle 2 for jetting saturated steam at a high pressure of 5 to 7 $Kg/cm^2$ and high temperature of 158 to 169° C. into chamber 1.

Figure 11:
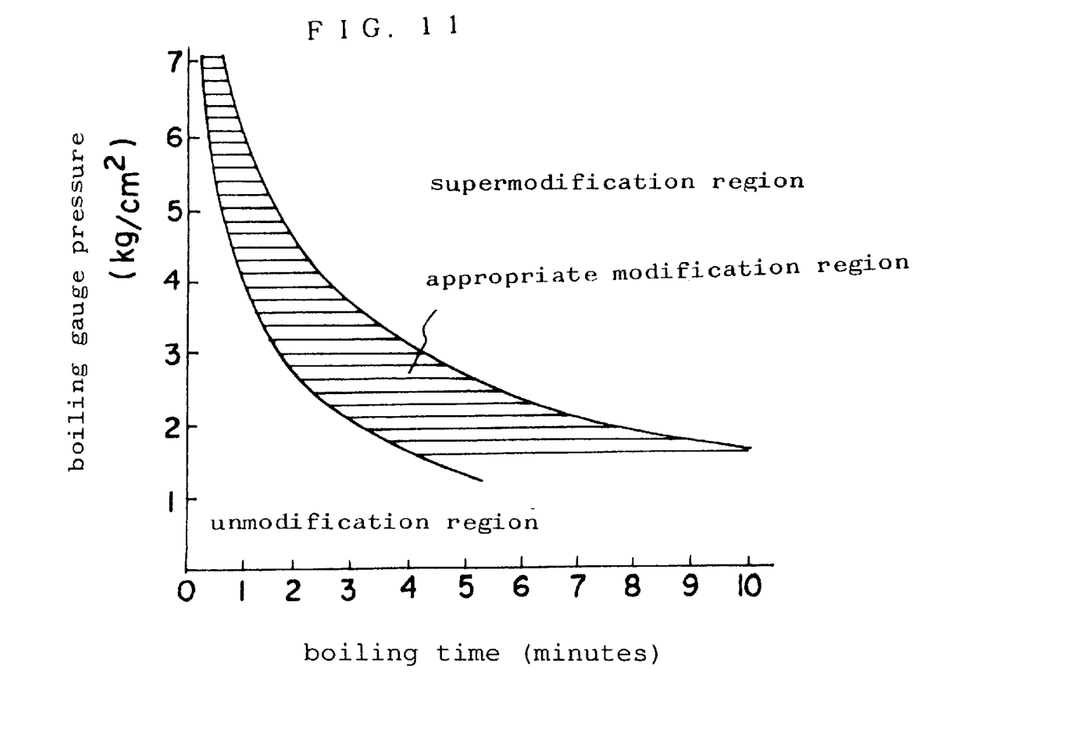
FIG. 11 is a graph showing the relation between time of steaming, gauge pressure of steam, and modification region.

From the result on the relation between the time of steaming gauge pressure of steam, and modification region as shown in FIG. 11, the inventor of the present invention has found that to expose beans to high pressure and high temperature is all right, wherein it was heretofore thought that when exposing beans to high pressures and high temperatures, a nitrogen component will turn into a super-modification region to excess, and that to use high pressures and high temperatures was senseless. The present invention has been made on the basis of the above-mentioned knowledge. In FIG. 11, the cross-hatched area indicates the appropriate modification region, an area under the appropriate region is the unmodification region, and an area above the appropriate modification region is the supermodification region. In this graph, the condition of steaming beans and the value of analysis of steamed beans are as shown in Table 1.

TABLE 1

Condition of steaming beans and the value of analysis of boiled beans

| No | Content | Gauge Pressure of steaming of Beans kg/cm$^2$ (temp. ° C.) | Time of steaming of Beans (minutes) | Rate of Digestion* (%) |
| --- | --- | --- | --- | --- |
| 1 | Comparison | 0.9 (117) | 45 | 86.13 |
| 2 | Test - 1 | 2.0 (133) | 5 | 91.60 |
| 3 | Test - 2 | 4.0 (152) | 2 | 93.74 |
| 4 | Test - 3 | 7.0 (170) | ¼ | 95.10 |

*The rate of nitrogen component which becomes soluble in trichroacetic acid, when steamed beans are decomposed with aspergillus oryzae proteolytic enzyme.

According to the present invention, vital germs stuck on the surface of beans and on portion of glycoside, particularly thermostable spore germs firmly stuck on beans by polysaccharide can be made to die out. Not only the surface of beans but also centers of beans can be heated in a very short period.

In the steaming of beans process, steaming of beans can be achieved in the period of 15 to 30 seconds at a speed 480 times higher than that in a conventional method by exposing beans to the saturated steam having high pressures of 5 to 7 Kg/cm$^2$ and high temperatures of 158 to 169° C. so that beans are steamed in a sterilized state.

Further, since waste steam is not released, the surroundings of a work area are not worsened, and heat loss is prevented to reduce energy cost.

DETAILED DESCRIPTION

Figure 1:
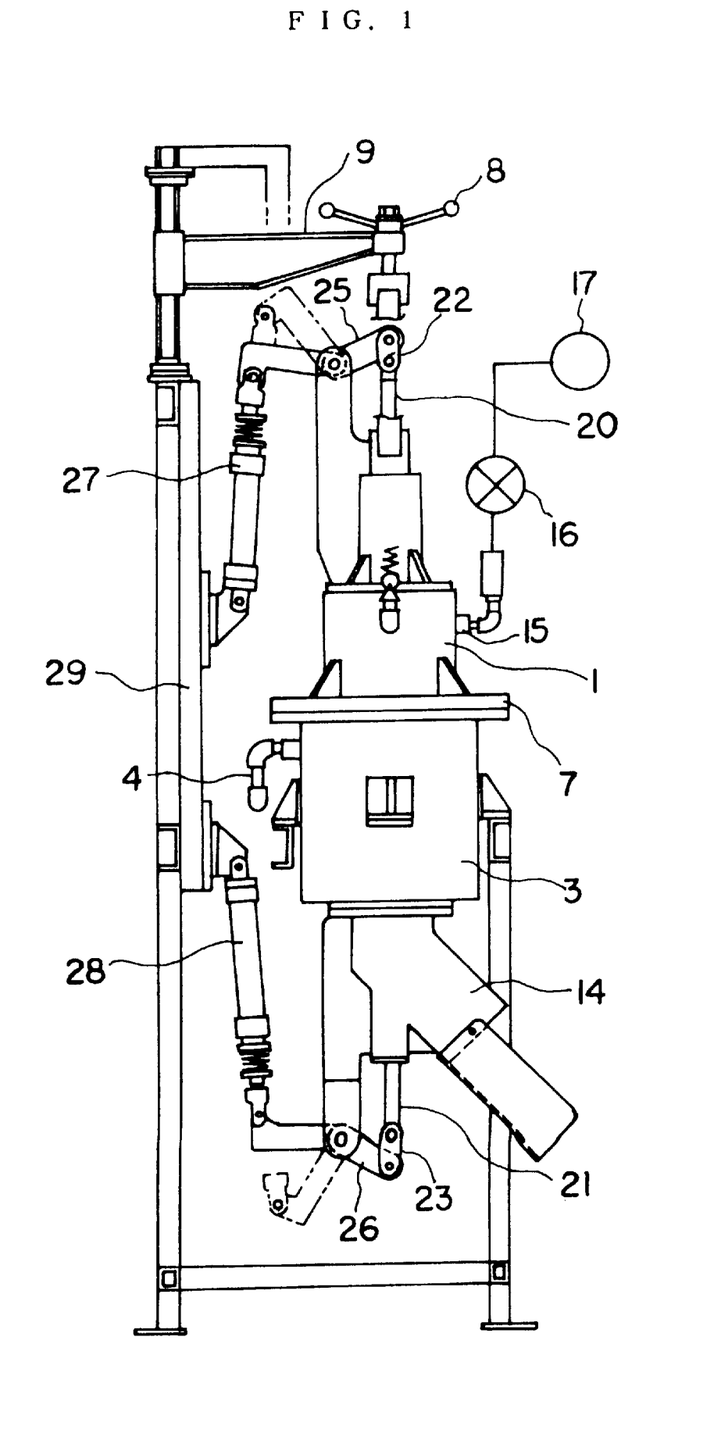
FIG. 1 is a front view showing schematically a batch apparatus of a first embodiment of the present invention used for carrying out the present invention.
Figure 2:
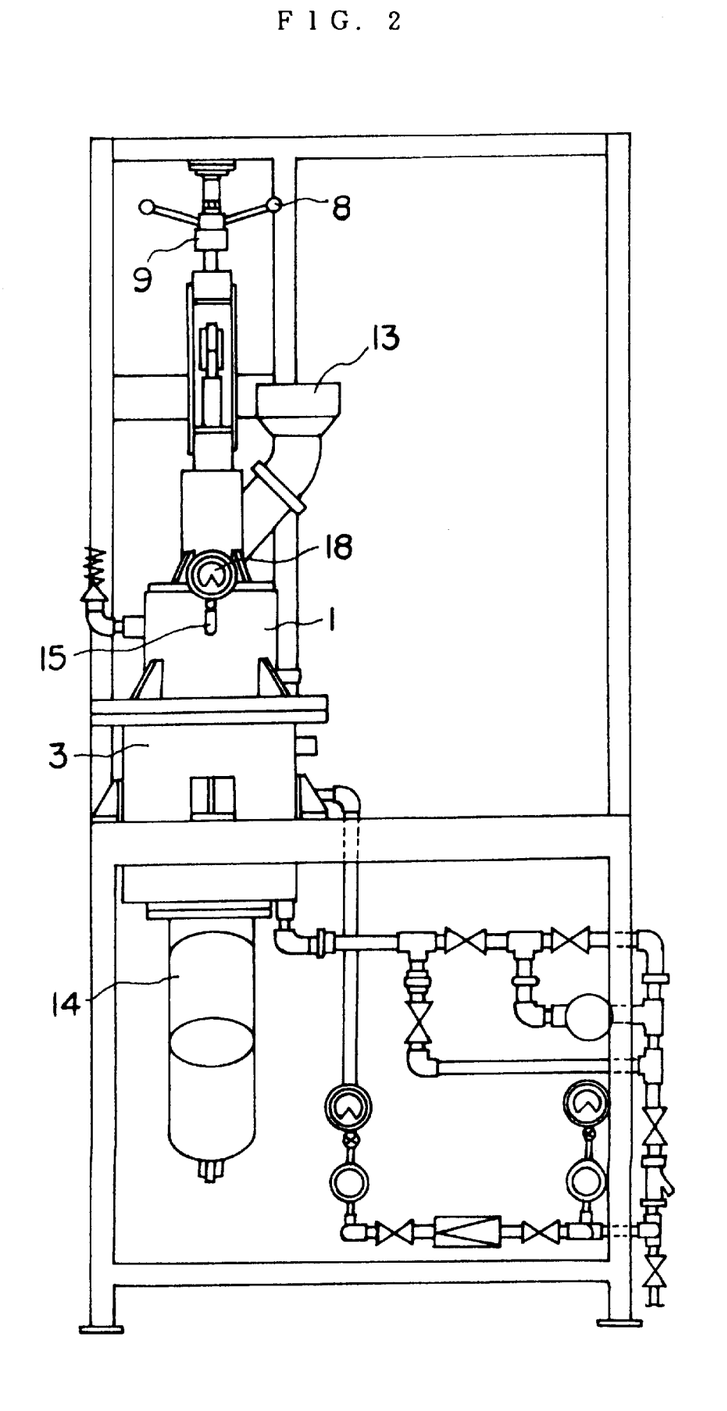
FIG. 2 is a side view of the batch apparatus shown in FIG. 1.
Figure 3:
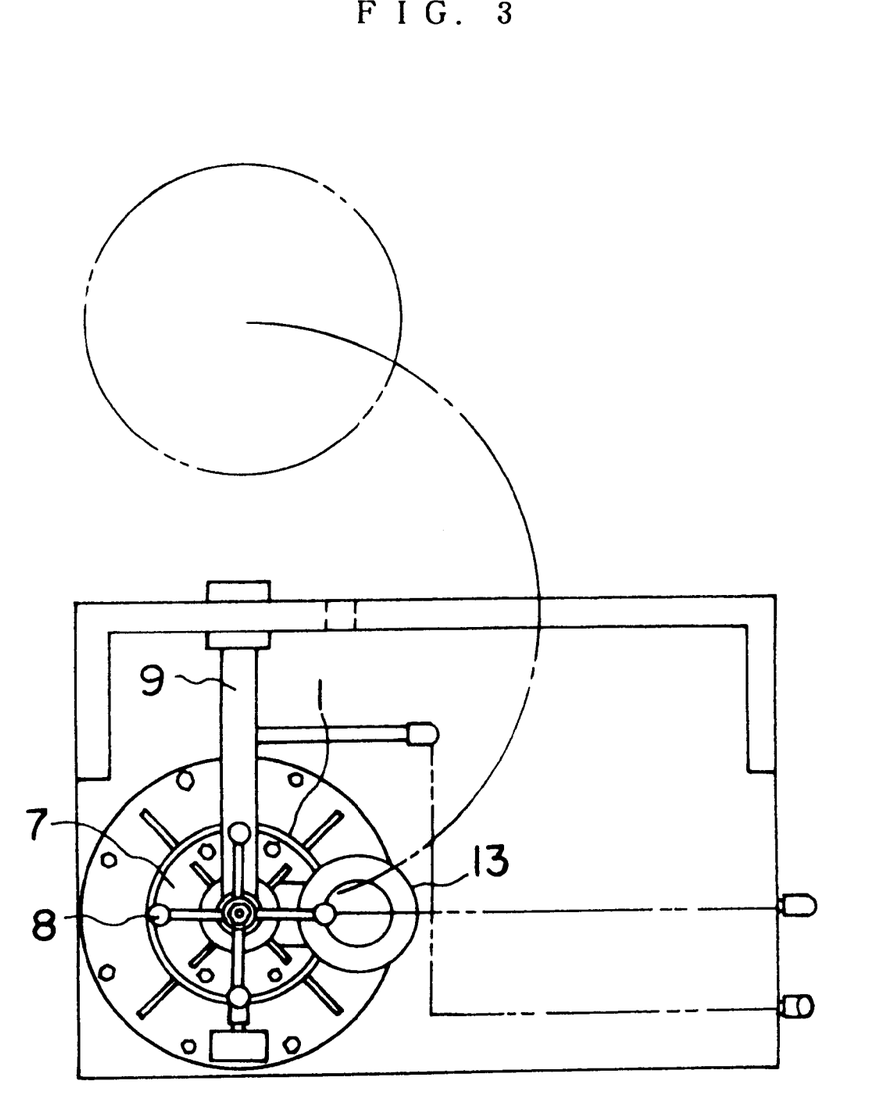
FIG. 3 is a top view of the batch apparatus shown in FIG. 1.
Figure 4:
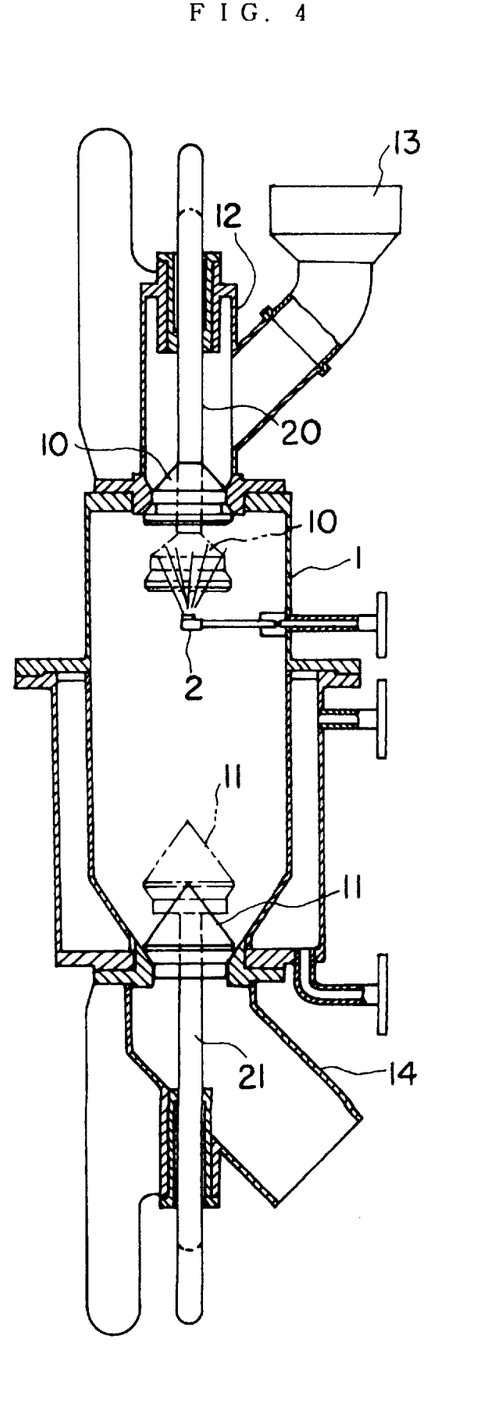
FIG. 4 is a vertical section of chamber 1 of the batch apparatus shown in FIG. 1.

An embodiment of the present invention is explained referring to the drawing, wherein FIG. 1 is a front view schematically showing an embodiment of a batch device used for carrying out the present invention, FIG. 2 is a side view of the batch apparatus of FIG. 1, FIG. 3 is a top view of the batch apparatus of FIG. 1, and FIG. 4 is a vertical section of chamber 1 of the batch apparatus.

As illustrated in FIGS. 1 through 4, the batch apparatus comprises chamber 1 in which beans are placed and which withstands high pressures ("pressure" hereinafter indicates a gauge pressure) of 5 to 7 Kg/cm$^2$, preferably of 6 Kg/cm$^2$ and high temperatures of 158 to 169° C., and nozzle 2 for jetting or injecting saturated steam having high pressures of 5 to 7 Kg/cm$^2$ and high temperatures of 158 to 169° C. into chamber 1. The outside of the chamber 1 is surrounded with jacket 3. Jacket 3 is used for retaining heat. However, when chamber 1 is cooled, refrigerant is passed through jacket 3. Further, when chamber 1 is rinsed, lid 7 can be lifted by means of handle 8 and moved crosswise by means of swiveling boom 9.

Chamber 1 is provided with charge valve 10 (FIG. 4) above the chamber for discharging or feeding beans into chamber 1 and with a discharge valve 11 under the chamber for discharging products from the chamber 1. The chamber has sleeve 12 extending upward from charge valve 10 with hopper 13 for inserting beans into the chamber, while the chamber has discharge sleeve 14 under discharge valve 11.

Nozzle 2 passes into chamber 1, while the outside of nozzle 2 communicates, through pipe 15 and valve 16, with boiler 17 in which saturated steam at high pressures of 5 to 7 Kg/cm$^2$ and high temperatures of 158 to 169° C. is generated. In the drawing, numeral 18 designates a pressure gauge.

The above-mentioned charge valve 10 and discharge valve 11 have vertical shaft 20 extending upward and vertical shaft 21 extending downward, respectively. Vertical shafts 20, 21 are connected with up-and-down driving mechanism 29 through links 22, 23, levers 25, 26 pivotably mounted on machine body 24 and shock absorbing rods 27, 28, respectively.

The operation of this apparatus is explained as follows. First, beans are thrown manually or by other means into hopper 13. Beans are then introduced through opened charge valve 10 into chamber 1. After a given amount of beans have been inserted into chamber 1, charge valve 10 is closed. Valve 16 is then opened to send steam into chamber 1, by which a beans-steaming process is carried out for a given time. In this beans-steaming process, by applying the saturated steam having high pressures of 5 to 7 Kg/cm$^2$ and high temperatures of 158 to 169° C. to the beans, moisture and heat are given into the inside of beans, by which heat-modification of a nitrogen component contained in beans is made in period of 15 to 30 seconds, so that the beans are turned into an appropriate modification region before super-modification region from an unmodification region to heat-modify the boiled beans. Accordingly, the beans, namely steamed beans are heat-modified, and can be steamed under aseptic conditions with a speed 480 times higher than that in a conventional case. A time needed for the heat-modification varies with different sorts of beans. After beans-boiling has been made for a given time, discharge valve 11 is opened, and boiled beans are then taken out through discharge sleeve 14 to the outside. In this case, since chamber 1 is a closed apparatus, waste water and steam are not exhausted at all so that heat efficiency is good.

By repeating the above-mentioned operation, beans-steaming can be continuously achieved.

As above-mentioned, in the present invention, since the nitrogen component contained in beans is turned into homogeneous modification-enable region from unmodification under the high pressure, reliance on experiences and perception of operator is not needed, and the necessity of another person's help is minimized. Further, a rate of digestion of nitrogen component in the modification-enable region is improved to such an extent that cannot be obtained by conventional methods (in manufacturing in the atmosphere or in the region which is pressurized weakly). As a result, a homogenization modification is made, and germs stuck on beans perish so that an aseptic condition is formed. Products made in which cooperative actions are shown that a rate of digestion of nitrogen component is improved, a time for steaming beans is shortened sharply from an hour time unit to a second time unit so that steaming can be achieved at speeds about 480 times higher than that in conventional cases so that the solid state of beans can be held since manufacturing time is short. Further waste water and steam is not exhausted at all.

Further, by continuously controlling the heating speed, it is possible to steam homogeneous boiled beans according to different sorts, states and other types of beans without needing special skill.

Figure 5:
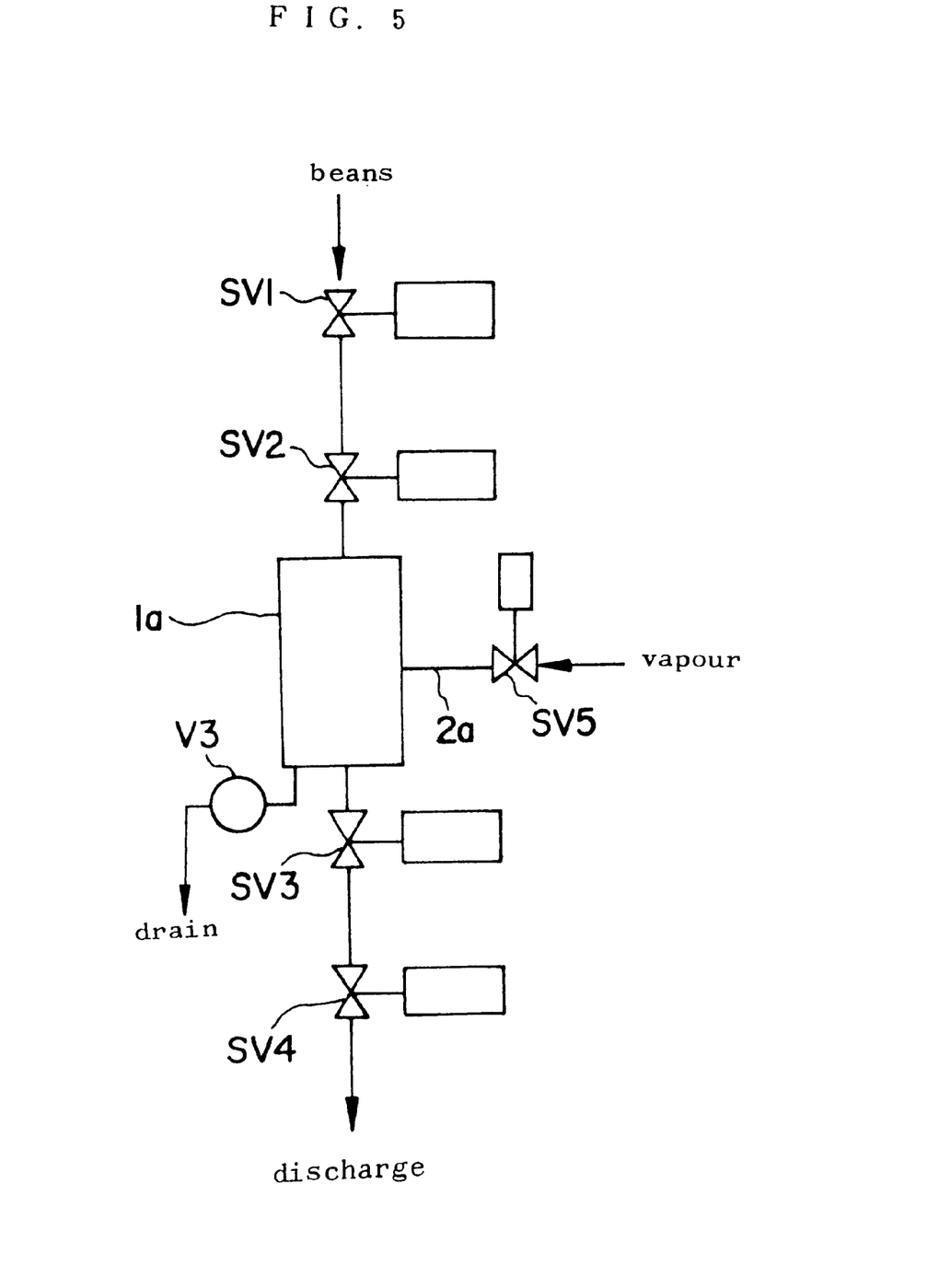
FIG. 5 is an explanatory schematic drawing showing a batch continuous apparatus of a second embodiment of the present invention used for carrying out the present invention.

FIG. 5 is an explanatory drawing schematically showing a batch continuous apparatus of a second embodiment of the present invention for carrying out the present invention. As illustrated in FIG. 5, the batch continuous apparatus comprises chamber 1a in which beans are put and which withstands high pressures ("pressure" hereinafter indicates a gauge pressure) of 5 to 7 Kg/cm$^2$, preferably about 6 Kg/cm$^2$ and high temperatures of 158 to 169° C., and nozzle 2a for jetting saturated steam having high pressures of 5 to 7 Kg/cm$^2$ and high temperatures of 158 to 169° C. into chamber 1a. In FIG. 5, SV1 designates an electromagnetic valve for controlling the feed of material, namely beans, to chamber 1. SV2 designates an electromagnetic valve for introducing beans into chamber 1 provided above chamber 1a, corresponding to the charge valve 10 in the first embodiment. SV3 designates an electromagnetic valve under chamber 1a for discharging beans from chamber 1a corresponding to discharge valve 11 in the first embodiment. SV4 designates an electromagnetic valve for removing products. V3 designates a drain valve provided under chamber 1a. Electromagnetic valves SV1 through SV4 timing operates as shown in Table 2. SV5 designates an electromagnetic valve for controlling the spouting of the saturated steam at high pressure and high temperature from nozzle 2a.

TABLE 2

| Valve Title of Operation | Process | | | |
|---|---|---|---|---|
| | SV1 | SV2 | SV3 | SV4 |
| Throwing of material into the apparatus | Opening | Shutting | Shutting | Shutting |
| Introduction of Material into Chamber | Shutting | Opening | Shutting | Shutting |
| Discharging of Product from Chamber | Shutting | Shutting | Opening | Shutting |
| Taking Out of product from the Apparatus | Opening | Shutting | Shutting | Shutting |

Figure 6:
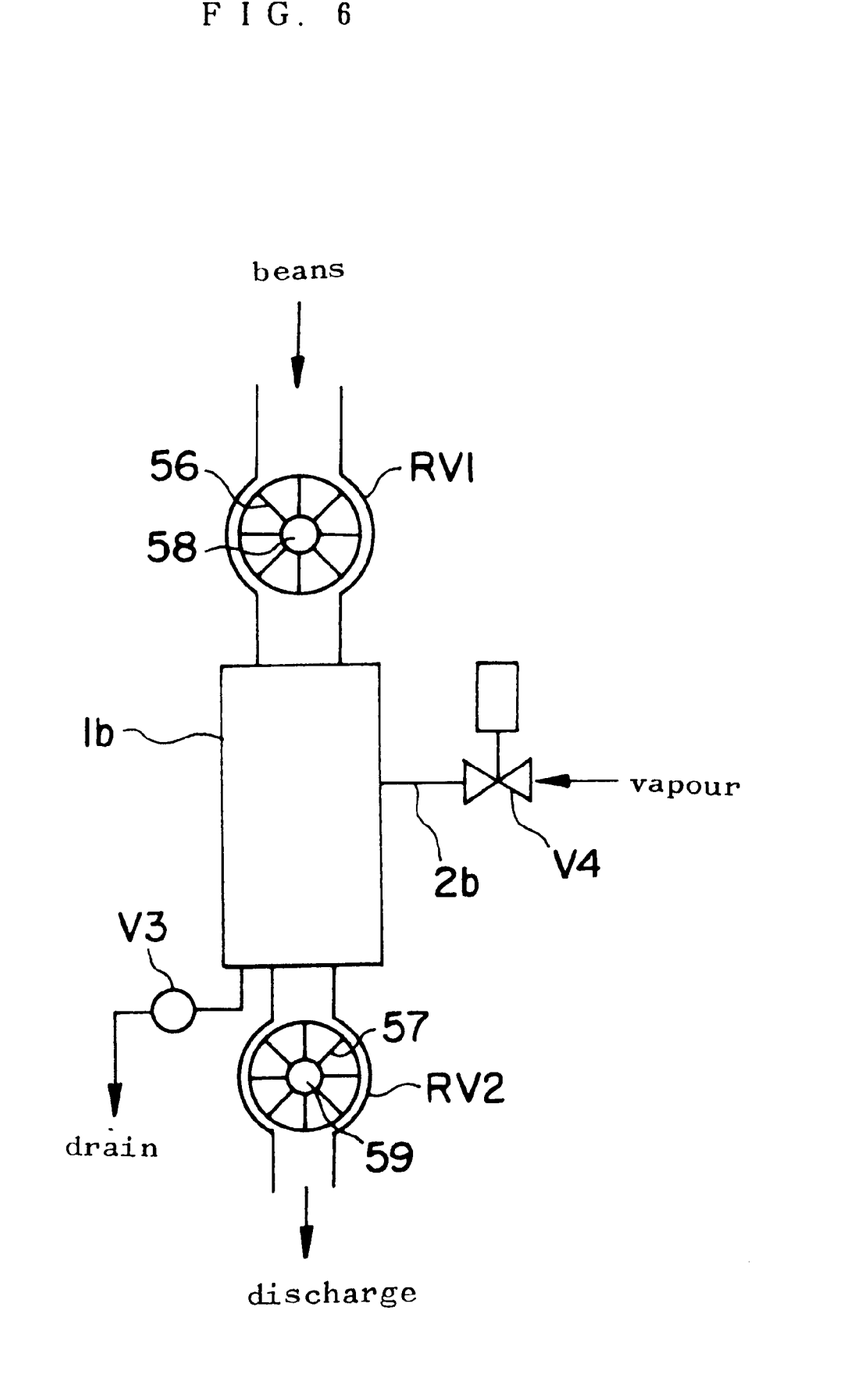
FIG. 6 is an explanatory schematic drawing showing a continuous apparatus of a third embodiment of the present invention used for carrying out the present invention.

FIG. 6 is an explanatory drawing for schematically showing a continuous apparatus of a third embodiment of the present invention for carrying out the present invention. As illustrated in FIG. 6, the continuous apparatus comprises chamber 1b in which beans are put and which withstands high pressures ("pressure" hereinafter indicates a gauge pressure) of 5 to 7 Kg/cm$^2$, preferably of 6 Kg/cm$^2$ and high temperatures of 158 to 169° C., and nozzle 2b for jetting saturated steam having high pressures of 5 to 7 Kg/cm$^2$ and high temperatures of 158 to 169° C. into chamber 1b. RV1 designates a rotary valve for controlling the feed of material, namely beans to chamber 1b, provided above chamber 1b. RV2 designates a rotary valve for removing beans provided under the chamber 1b. V3 designates a drain valve provided under chamber 1b. V4 designates an electromagnetic valve for controlling spouting of saturated steam at high pressures and high temperatures from nozzle 2b.

The above-mentioned rotary valves RV1 and RV2 are comprised of a plurality of vanes 56; 57 which are mounted at equally angularly spaced points radially along the axis of rotation 58; 59 which extend in a horizontal direction, respectively.

In this apparatus, material is in order sent to chamber 1b through rotary valve RV1. The material is exposed to saturated steam having high pressures of 5 to 7 Kg/cm$^2$ and high temperatures of 158 to 169° C. within chamber 1b in the given period to become product. Thereafter product is continuously removed through rotary valve RV2 from the continuous apparatus.

Figure 7A:
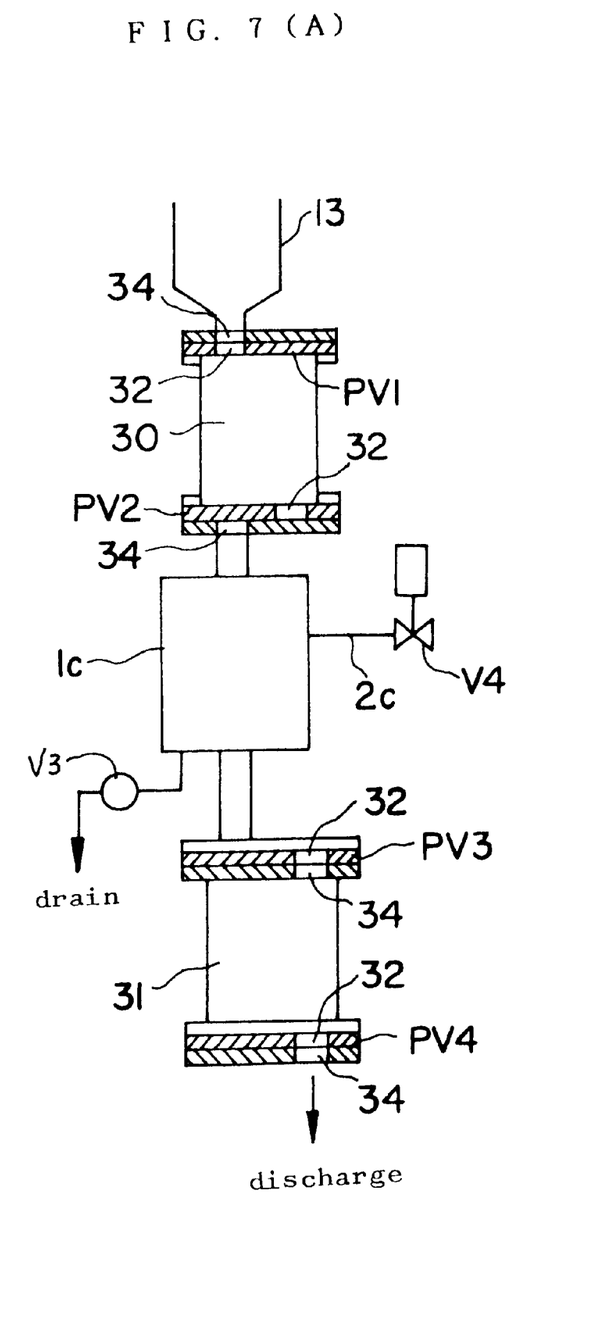
FIG. 7(a) is an explanatory schematic drawing showing a batch continuous apparatus of a fourth embodiment of the present invention used for carrying out the present invention.
Figure 7B:
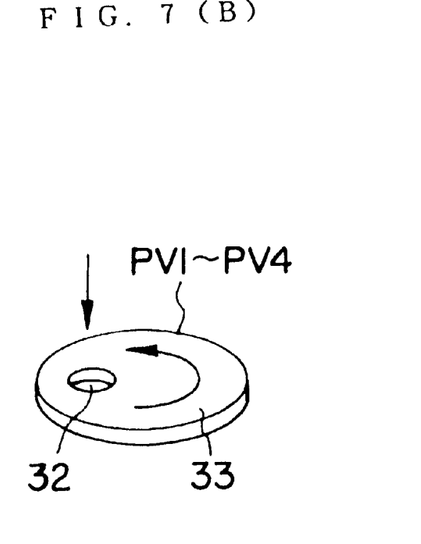
FIG. 7(b) is a sectional view of a circular disc 33 used in the batch continuous apparatus shown in FIG. 7(a)

FIG. 7 is an explanatory drawing for schematically showing a batch continuous apparatus of a fourth embodiment of the present invention for carrying out the present invention. As illustrated in FIG. 7, the continuous apparatus comprises chamber 1c in which beans are put which withstands high pressures ("pressure" hereinafter indicates a gauge pressure) of 5 to 7 Kg/cm$^2$, preferably of 6 Kg/cm$^2$ and high temperatures of 158 to 169° C., and nozzle 2c for jetting saturated steam having high pressures of 5 to 7 Kg/cm$^2$ and high temperatures of 158 to 169° C. into chamber 1c. PV1 designates a planar rotary valve for controlling the feeding of material to the apparatus, namely beans provided above chamber 1c. PV2 designates a planar rotary valve for introducing beans into chamber 1c provided above chamber 1c, corresponding to the charge valve 10 in the first embodiment. PV3 designates a planar rotary valve for discharging beans from chamber 1c provided under chamber 1c, corresponding to the discharge valve 11 in the first embodiment. PV4 designates a planar rotary valve for removing product from the batch continuous apparatus. V3 designates a drain valve provided under the chamber 1c. V4 designates an electromagnetic valve for controlling spouting of the saturated steam at high pressures and high temperatures from nozzle 2c.

The above-mentioned planar rotary valves PV1, PV2, PV3, PV4 are formed into circular plates 33, respectively, and arranged at the upper end and lower end of sleeves 30; 31, respectively, wherein respective circular plates 33 have a changeover through holes 32, 32, 32, 32 each of which shifts in its position with respect to each other as illustrated in FIG. 7. Number 34 designates a fixed changeover through a hole communicating with the changeover through holes 32, 32, 32, 32 provided in sleeves 30; 31. Timing of the operation of planar rotary valves PV1, PV2, PV3, PV4 is in the same manner as that of electromagnetic valves SV1 to SV4 shown in FIG. 2.

In this apparatus, material is in order sent to chamber 1c through planar rotary valves PV1, PV2. The material is exposed to saturated steam having high pressures of 5 to 7 Kg/cm² and high temperatures of 158 to 169° C. within chamber 1c in the given period to become product, thereafter the product is continuously removed through rotary valve PV3, PV3 from the batch continuous apparatus.

Figure 8:
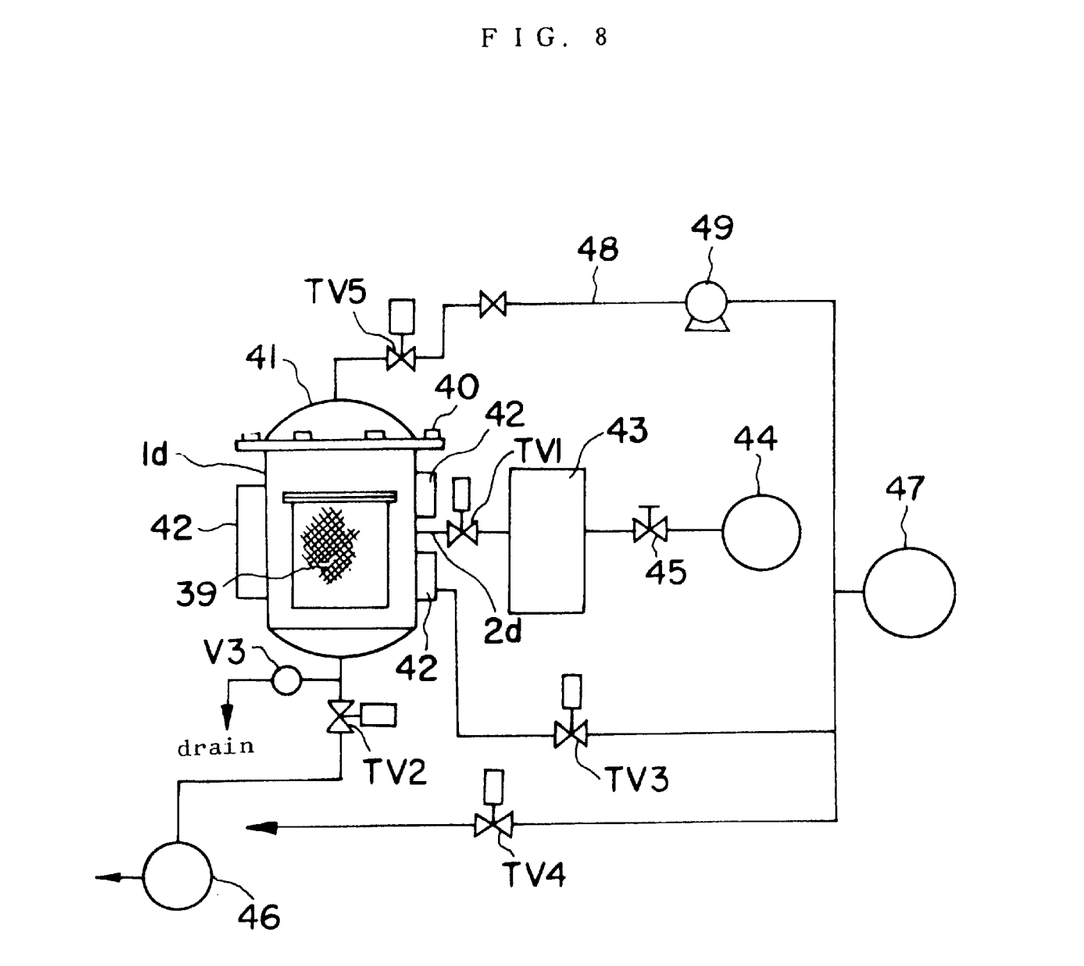
FIG. 8 is an explanatory schematic drawing showing a batch continuous apparatus of a fifth embodiment of the present invention used for carrying out the present invention.

FIG. 8 is an explanatory drawing for schematically showing a batch apparatus of a fifth embodiment of the present invention for carrying out the present invention. As illustrated in FIG. 8, the continuous apparatus comprises chamber 1d in which beans are put that withstands high pressures ("pressure" hereinafter indicates a gauge pressure) of 5 to 7 Kg/cm², preferably of 6 Kg/cm² and high temperatures of 158 to 169° C., and nozzle 2d for jetting saturated steam having high pressures of 5 to 7 Kg/cm² and high temperatures of 158 to 169° C. into chamber 1d. Chamber 1d has cage 39 which has opening and shutting lid 41 fixed to the upper portion thereof through fixture 40 and jacket 42 for cooling around the outside of its body.

The above-mentioned nozzle 2d passes into chamber 1d, and communicates, through electromagnetic valve TV1, booster tank 43, and valve 45, with boiler 44 in which saturated steam having high pressures of 5 to 7 Kg/cm² and high temperatures of 158 to 169° C. is generated. The lower portion of chamber 1d communicates, through electromagnetic valve TV2 and heat exchanger 46, with a drain. Further, the lower portion of chamber 1d communicates, through drain valve V3, with a drain. The above-mentioned jacket 42 communicates, through electromagnetic valve TV3, with a source of cooling water 47, and communicates, through electromagnetic valve TV4, with the heat exchanger 46. The upper portion of chamber 1d communicates, through an electromagnetic valve TV5, shower line 48, and pump 49, with a source of cooling water 47.

These electromagnetic valves TV1 to TV5 operate in a timing as shown in Table 3.

TABLE 3

Operation of electromagnetic valves TV1 to TV5 after material (beans) has been put into the chamber (cage), and the lid is fixed to the chamber.

|  | TV1 | TV2 | TV3 | TV4 | TV5 |
|---|---|---|---|---|---|
| Heating | Opening | Shutting | Shutting | Shutting | Shutting |
| Cooling | Shutting | Opening | Opening | Opening | Shutting |

* After cooling (and after the inside of the chamber is brought back to atmospheric pressure,) the lid is lifted to take out steamed beans.

In this apparatus, beans are inserted into cage 39 in order to prevent the beans from getting out of shape during boiling. Opening and shutting lid 41 is opened, and the cage containing beans is inserted into chamber 1d through the lid. Opening and shutting lid 41 is then shut, and the beans exposed to saturated steam having high pressures of 5 to 7 Kg/cm² and high temperatures of 158 to 169° C. in the given period. Thereafter, opening and shutting lid 41 is opened, while product is discharged from the chamber 1.

Figure 9:
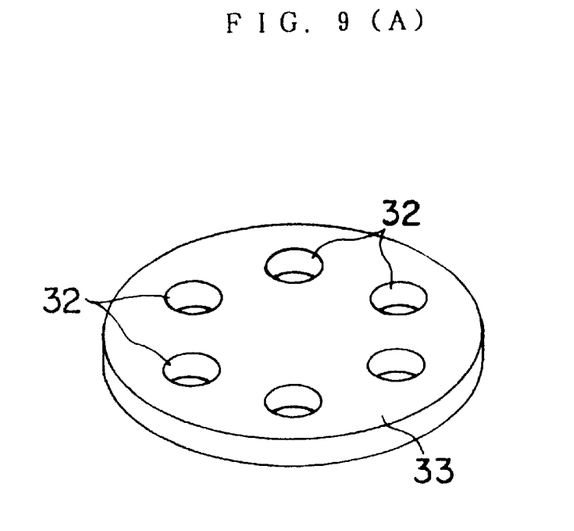
FIG. 9(a) is a sectional view showing other example of circular disc of a rotary valve of the present invention.
FIG. 9(b) is a vertical section of the circular disc shown in FIG. 9(a)

FIG. 9 shows another example of circular plates 33 of the above-mentioned planar rotary valves PV1, PV2, PV3, PV4 in the fourth embodiment, wherein each circular plate has a plurality of changeovers through holes 32, 32, at equally angularly spaced points so that the continuous operation become possible. Numeral 34 designates a fixed changeover through hole provided in the sleeves 30; 31, wherein a fixed changeover through hole 34 communicates with the changeover through holes 32, 32, 32, 32, 32.

EXAMPLE

TABLE 4

(Example 1)

| Conditions: | Pressure of steam 6 Kg/cm²G (at a temperature of 164° C.) |
|---|---|
| Material beans: | Adzuki (Hokkai adzuki) |
| The mount of material | 15 Kg per time |
| Method | Batch continuous operation |
| Method | When carrying out the method under the above-mentioned Conditions |
| Time of heating | 15 seconds(the period of from when the pressure has reached 6 Kg/cm²) |
| The number of germs | germ-free |
| (Usually, 14 pieces per g of thermostable germinate bacteria were found) | |
| The rate of digestion: | 95.1% |
| (Usually, the rate of digestion was 86.13%, when the same material was boiled for 1.2 hours) | |
| Increase of the ratio (yield rate) | 8.97% of digestion |

According to Example 1, a product recovery percentage about 9% higher than in a conventional case was obtained, which means material of 9% escaped hitherto.

TABLE 5

(Example 2)

| Conditions: | Pressure of steam 5.6 Kg/cm²G (at the temperature of 162° C.) |
|---|---|
| Material beans | Soybeans (material fermented soybeans) |
| The amount of material | 60 Kg per one time |
| Method | Continuous operation |
| Method | In double valves continuous method shown in FIG. 5 |
| Time of heating | 16 seconds |
| (Since the inside of the chamber is maintained at 5.6 Kg/cm², heat loss is not found while the temperature is raised) | |
| The number of germs | zero (germ-free) |
| (Usually, 37 to 38 pieces per g of thermostable spore germs were founded) | |
| The rate of digestion | 94.91% |
| (Usually, when beans are steamed under the pressure of 0.2 Kg/cm², time of heating is 1 hour and 15 seconds, the rate of digestion was 87.97%.) | |

According to Example 2, the product yield rate can be improved to an extent that the recover percentage of 10% higher than conventional case is achieved.

As the result of tests of the present invention made under various conditions, excellent results were obtained as shown in a table on comparison of the test results according to the present invention compared with the test results by a conventional method.

TABLE 6

Comparison of the present invention with conventional method

| | Conventional Method | Relative Merits | Relative Merits | Conditions of the Present Invention | Characteristics |
|---|---|---|---|---|---|
| Time of boiling | 2 to 3 hours boiling in unit of hours is needed | | Superior | 15 to 30 seconds steaming in unit of seconds | It is possible to speed up about 100 times higher than a conventional method even though time for charge and discharge of material is considered |
| Rate of digestion | 86.13% (at 0.9 Kg/cm$^2$, 117° C. and 45 minutes) | | Superior | 95.10% (at 6 Kg/cm$^2$, 164° C. and 15 seconds) | A rise in the ratio of N component, 8.97% increase in yield rate |
| Temperature of boiling | The order of 100° C. to 116° C. (atm. to 0.18 Kg/cm$^2$) | Superior | | The order of 158° C. to 170° C. (5 to 7 Kg/cm$^2$) | Steaming at high temperature, high pressure steam is needed |
| Radiant heat | Heat loss is large because of continuous heating for hours | | Superior | Hardly any heat loss because of steaming on the order of 15 seconds | Lowering of cost of heating |
| Working ability | Lacking in continuity since there are intervals because of batch system of 2 to 3 hours | | Superior | Nearly continuous steaming of beans is possible | Hardly any waiting time |
| Control of the number of germs | When boiling of beans has been finished, the existing of germs were confirmed: mold 2 × 10$^{-1}$ bacillus 2 × 10$^1$ general vital germs 9 × 10$^2$ the number of vital germs <10$^2$ | | Superior | The number of germs is zero (all of germs died) in 130° C. × 30 minutes hold | Manufacturing of sterilized beans was made possible |
| Use of chemicals | Use of wash, enzyme detergent, and medicine for sterilizing | | Superior | Chemicals not needed at all | No additive |
| Homogenization | Uneven boiling generated by piling up of beans caused by boiling large amounts of beans because of batch system | | Superior | Uneven steaming not generated because homogenization is promoted under the high pressure | Improvement in Homogenization |
| Shape of grains | It is difficult to boil beans into shape of grains since beans are reduced to jelly because uneven boiled portions are easily generated | | Superior | Product having shape of grains are taken out because steaming of beans is carried out in the appropriate modification region of nitrogen | Product can be steamed in shape of grains |
| Washing | It is needed to | | Superior | Extraneous | Self-cleaning |

TABLE 6-continued

Comparison of the present invention with conventional method

| | Conventional Method | Relative Merits | Relative Merits | Conditions of the Present Invention | Characteristics |
|---|---|---|---|---|---|
| | wash beans by hand in order to remove extraneous matter from beans | | | matter is almost not found because steaming is under the high pressure | |
| Countermeasure for steam (vapor) | Increase in mold, a rise in moisture and worsening of building are caused by release of waste steam into atmosphere within a working area | | Superior | Release of waste steam is almost not found | Improvement in the surrounding work area within a room |
| Place where apparatus is installed | Space of chamber is needed for boiling the needed amount of beans | | Superior | A space smaller than ½ of conventional case is sufficient for working since a time for heat-modification is short | Increase in coefficient of efficient utilization, per unit area |
| The size of boiling chamber | An ability of factory is fixed when selecting the size of chamber, Alteration of a lot is difficult | | Superior | The size of steaming chamber is small because of batch continuous system. continuous system or Treatment of large amount of beans can be determined by the length of time. | Variable operation is possible |

As mentioned hereinabove, in the present invention, since compulsive heat exchange is carried out under high temperatures, it becomes possible to sharply shortened the time for steaming of beans so that a waiting time during steaming of beans is almost not needed. Because of the short time of steaming of beans, the state of grains can be held, so that beans cannot be reduced to pieces, and heat energy can be efficiently used. As merits of beans being steamed under high temperatures and high pressures, it is given that the steaming of sterilized grained beans has become possible, and the number of days through which beans such as grained beans and bean jelly and others can be kept can be sharply increased.

Further, in the case of fermented soybeans, since the product obtained by a conventional method have remaining germs thereon (sticking of various germs), when bacillus is planted to steamed beans, the bacillus is affected by the remaining germs, so that ill-tasting fermented soybeans are made. Accordingly, a manufacturer is worried about countermeasure against the remaining germs on beans.

By applying the present invention to the manufacture of fermented soybeans, it becomes possible to plant pure bacillus to steamed beans, by which the taste of fermented soybeans can be substantially improved.

As mentioned hereinabove, in the present invention, steaming of beans can be achieved in a period of 15 to 30 seconds at a speed 480 times higher than that by a conventional method by exposing beans to saturated steam at high pressures ("pressure" hereinafter indicates a gauge pressure) of 5 to 7 $Kg/cm^2$ and high temperatures of 158 to 169° C. Further, since no waste steam is released, surrounding work areas are not worsened, and heat loss is prevented reducing energy costs. Further, experienced and skilled worker is required. Since vital germs stuck on beans, particularly thermostable spore germs stuck on beans by polysacharide mucus are made to die out, and the process of heating of beans is made in a short period, beans do not decompose, by which a method of steaming of beans in which the quality of beans is not worsened and an apparatus therefore can be provided according to the present invention.

What is claimed is:

1. A method for the steam treatment of beans comprising;
   supplying beans to a chamber (1);
   injecting steam into said beans in said chamber at a pressure in the range between 5 to 7 $Kg/cm^2$ and temperature in the range of 158 to 169° C.;
   holding said beans in said chamber for a period between 10 and 30 seconds;

removing said beans after a predetermined period;

whereby said beans are steamed under sterilized conditions.

2. The method according to claim 1, in which said pressure is 6 Kg/cm².

3. The method according to claim 2 in which said period of time is 15 seconds.

4. A method for the steam treatment of beans comprising;

feeding a volume of beans into a chamber (1), injecting saturated steam into said chamber at a high pressure of 5 to 7 Kg/cm², and a high temperature in the range of 158° to 169° C. in said chamber (1), exposing said volume of beans to said high pressure of 5 to 7 Kg/cm² and high temperature in the range of 158° to 169° C. for a period of 15 to 30 seconds;

whereby steaming of said beans is achieved in a sterilized state.

* * * * *

UNITED STATES PATENT AND TRADEMARK OFFICE
CERTIFICATE OF CORRECTION

PATENT NO. : 6,183,798 B1
DATED : February 6, 2001
INVENTOR(S) : Shigeru Ishii

It is certified that error appears in the above-identified patent and that said Letters Patent is hereby corrected as shown below:

<u>Title page,</u>
Item [30], Foreign Application Priority Data, delete "March 9, 1999" and insert -- March 9, 1998 --;

<u>Column 6,</u>
Line 15, after Table 2, insert -- · Continuous work is made by continuously carrying out opening and shutting of valves. · Opening and shutting of SV3 is carried out after material is held within the chamber for a period of 10 to 30 seconds. --;

<u>Column 11,</u>
Table 6-continued, in the row "The size of boiling chamber"
Column 5, "batch continuous system. Continuous system or" should be -- batch continuous system of continuous system. --.

Signed and Sealed this

Sixteenth Day of July, 2002

*Attest:*

JAMES E. ROGAN
*Attesting Officer*     *Director of the United States Patent and Trademark Office*